US005601304A

United States Patent [19]
Tilly et al.

[11] Patent Number: 5,601,304
[45] Date of Patent: Feb. 11, 1997

[54] FRONT SUSPENSION ARM MOUNTING ARRANGEMENT

[75] Inventors: Raymond H. Tilly, Rochester Hills; Carolyn R. Hartleip, Lake Orion; Roman T. Kogut, Sterling Heights, all of Mich.

[73] Assignee: Chrysler Corporation, Auburn Hills, Mich.

[21] Appl. No.: 574,663

[22] Filed: Dec. 19, 1995

[51] Int. Cl.⁶ .................................................. B60G 3/00
[52] U.S. Cl. .......................................... 280/673; 280/716
[58] Field of Search ........................... 280/93, 96.1, 673, 280/690, 716

[56] References Cited

U.S. PATENT DOCUMENTS

| | | | |
|---|---|---|---|
| 2,085,591 | 6/1937 | Kliesrath | 280/690 |
| 4,720,120 | 1/1988 | Shimatani et al. | 280/671 |
| 4,762,336 | 8/1988 | Ogawa et al. | 280/673 |
| 4,778,199 | 10/1988 | Haggerty et al. | 280/721 |
| 4,881,749 | 11/1989 | Bausch | 280/716 |
| 5,016,903 | 5/1991 | Kijima et al. | 280/716 |
| 5,026,090 | 6/1991 | Sekino | 280/673 |
| 5,040,824 | 8/1991 | Süss | 280/673 |
| 5,362,090 | 11/1994 | Takeuchi | 280/660 |

*Primary Examiner*—Kenneth R. Rice
*Attorney, Agent, or Firm*—Thomas G. Pasternak

[57] ABSTRACT

An arrangement for swingably supporting a lower suspension control arm on a vehicle frame member includes a front clevis fitting pivot bolt for the arm front pivot bushing assembly and a rear upstanding housing formed with a cavity for receiving a generally oval sectioned elastomer rear pivot bushing. The housing defines an undersurface having a cavity access opening from which its opposed side faces extend upward ending in a half-circle shaped ceiling. An aft projecting arm portion terminates in an integral stem, which extends through an elliptical sectioned axial passage in the rear bushing, wherein the bushing is retained on the stem after being stretched-over an integral nub on the stem's distal end. The bushing is configured for reception in the cavity, after which side flanges of a bushing retainer are attached by threaded fasteners to the housing undersurface. Upon the fasteners being tightened, the retainer, which has a body portion conforming to the remaining lower portion of the bushing, pre-compresses the bushing into the cavity such that the bushing resiliently absorbs stem loads transmitted from the arm. The one-piece cast arm has a lateral arm portion front loop close machined bore, into which an outer steel sleeve of the front bushing assembly is press-fit in a forward direction to a specified distance relative to a cast rear face of the stem collar. This arrangement allows the ends of the front arm portion to remain "as cast" while achieving close tolerance positioning of the front bushing assembly relative to the vehicle frame.

13 Claims, 9 Drawing Sheets

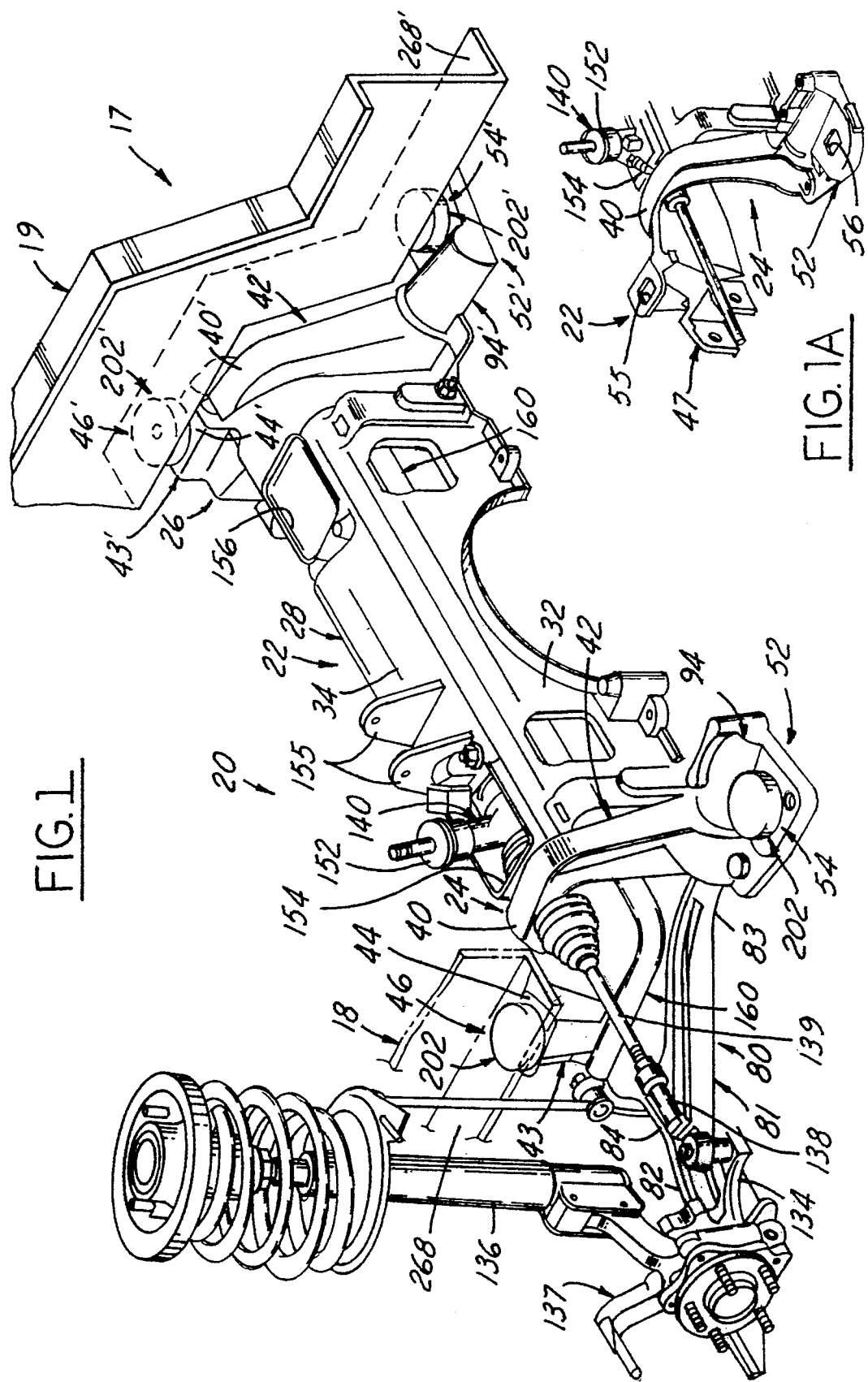

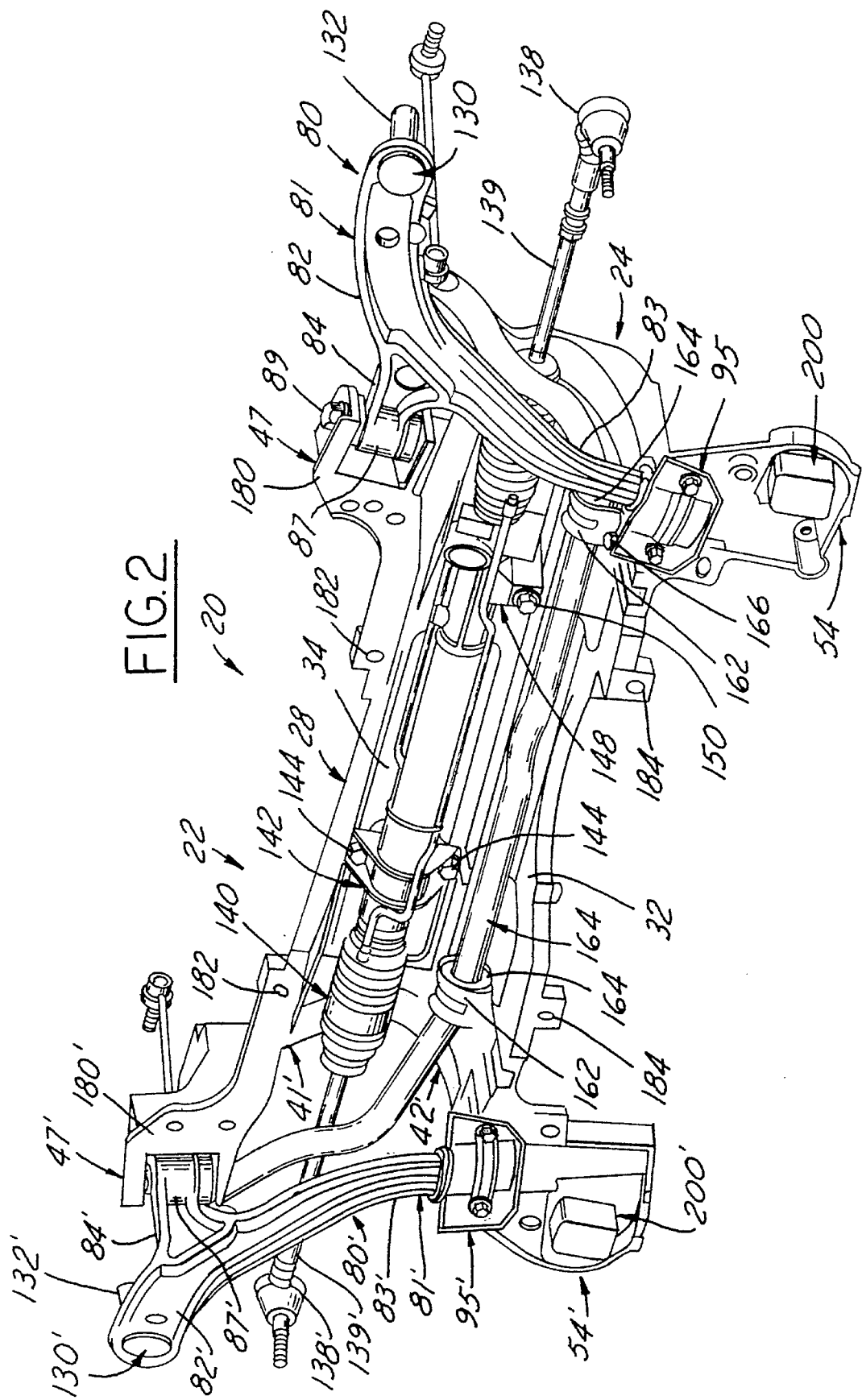

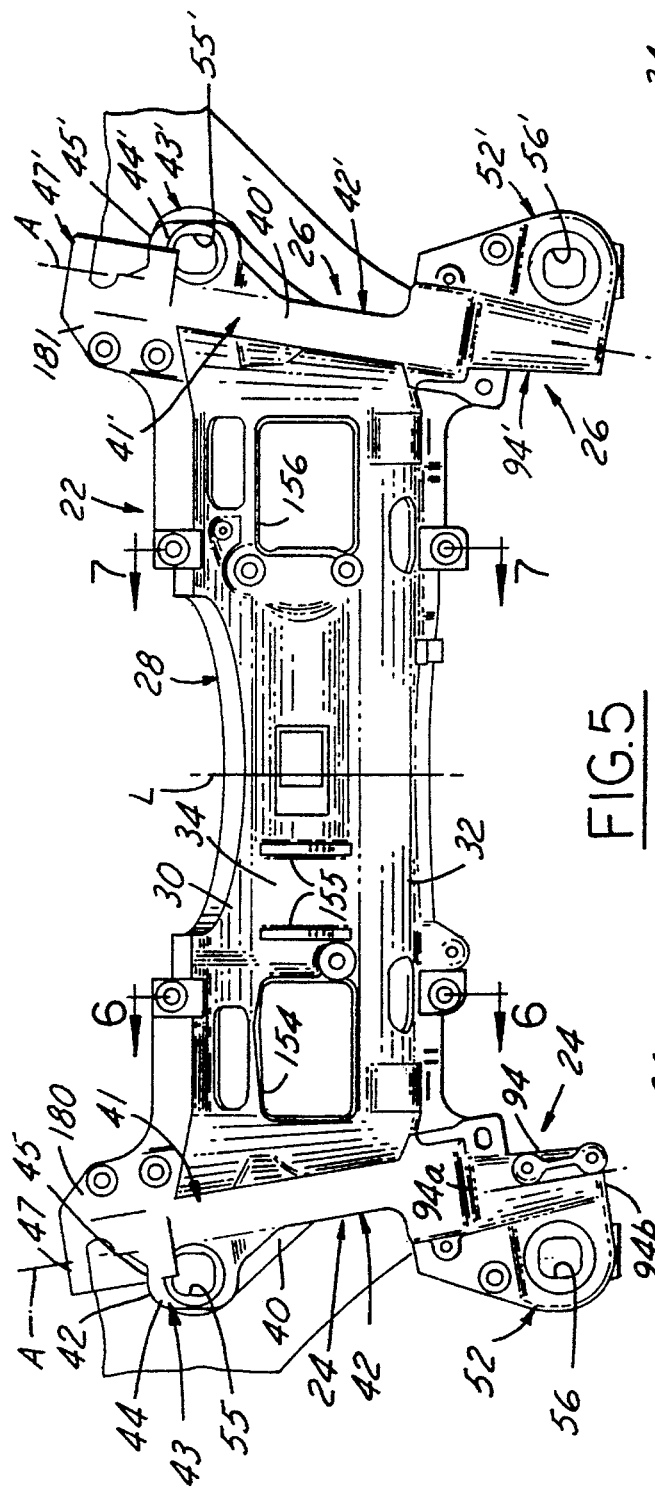
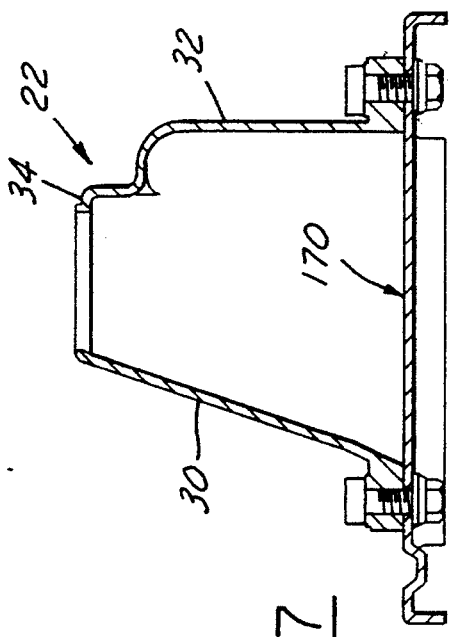
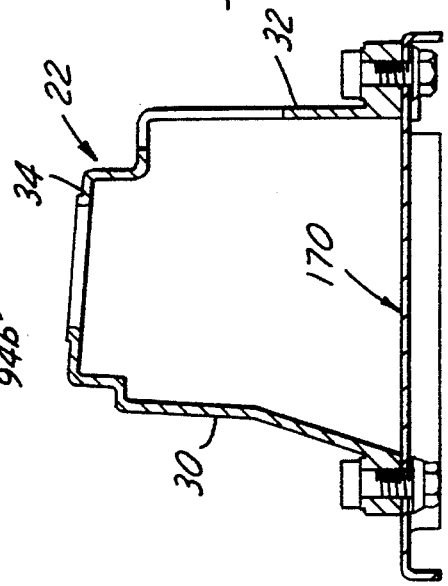

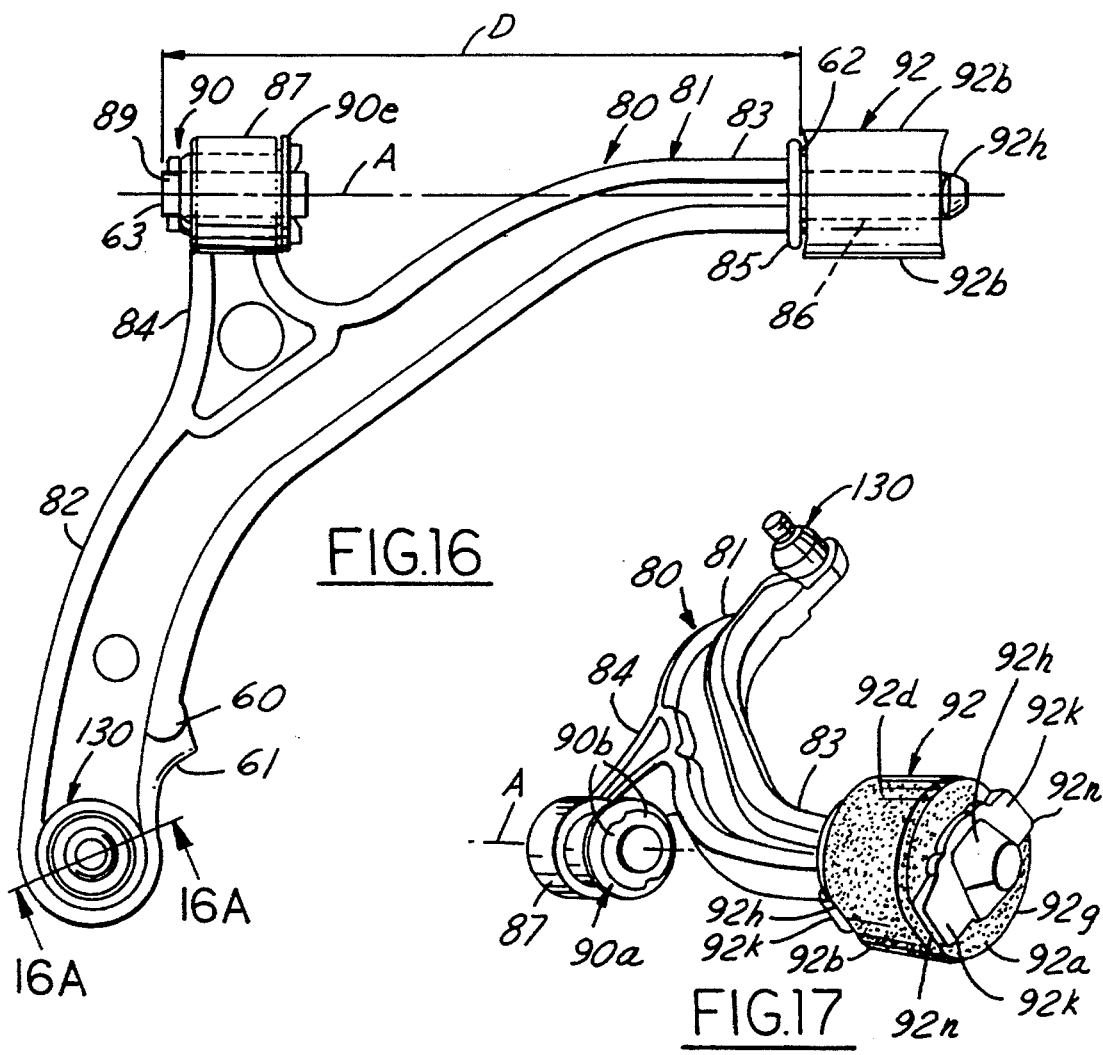
FIG.16
FIG.17
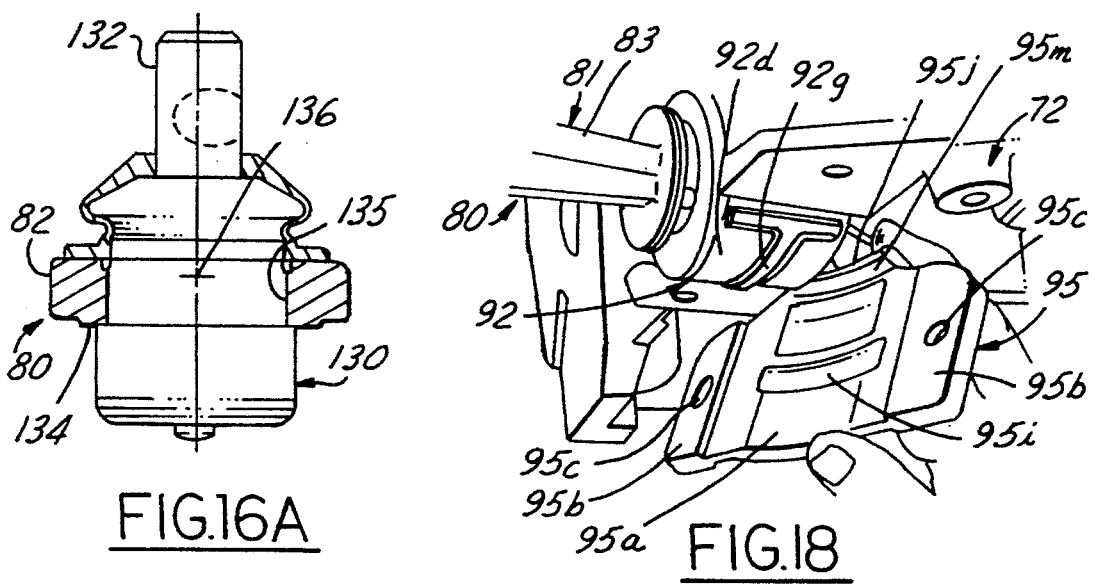
FIG.16A
FIG.18

5,601,304

FRONT SUSPENSION ARM MOUNTING ARRANGEMENT

FIELD OF THE INVENTION

This invention relates to vehicle front suspensions and, more particularly, to a mounting arrangement for swingably supporting a front suspension lower control arm on a vehicle frame member.

1. Background of the Invention

In front-wheel-drive vehicle suspensions, it is common to provide a generally L-shaped front suspension lower control arm, with front and rear arm portions connected to a chassis frame member through associated front and rear pivot bushings. The control arm front bushing is connected by a pivot bolt while the arm has a rearwardly extending journal portion on which is fitted a rear bushing sported by a bracket which is in turn secured to the chassis.

2. Summary of the Invention

It is a feature of the present invention to provide a vehicle suspension lower control arm mounting arrangement wherein the arm and a journal stem are formed as a one-piece member requiring minimal machining and assembly operations.

It is another feature of the present invention to provide a vehicle suspension lower control arm having a front bushing assembly adapted for mounting on a frame member pivot bolt about a swing axis by means of an outer sleeve press-fitted in an arm loop bore. An arm rear elastomeric bushing, formed with a central passage resiliently stretched over a nub cast on the stem distal end, is adapted for pre-compressed reception in a frame member housing cavity. The rear bushing passage has an elliptical-section which tightly retains the bushing in a predetermined orientation so as to resiliently absorb laterally imposed arm front driving wheel loads.

More specifically in the present invention, the rear bushing is formed with a generally oval-like cross section and received in a frame member housing cavity by means of a free access opening in the housing undersurface. An upper portion of the rear bushing is sized for press-fit conforming reception in the cavity and thereafter a retainer is adapted to enclose a lower portion of the bushing extending below the undersurface. The retainer traps the bushing in the cavity by a pair of retainer flanges being bolted to the housing undersurface. Upon the bolts being threadably tightened, the flanges are drawn into flush contact with the housing undersurface causing the retainer to exert a pre-compression load on the bushing.

Accordingly, the rear bushing defines an upper half-round surface and a lower slightly curved surface joined by planar side faces. The bushing lower surface is formed with a transversely extending raised rib, positioned at a midpoint of the bushing, adapted for reception in a transverse groove formed in a central concavo-convex portion of the retainer. Upon the retainer being attached to the housing undersurface, the bushing raised rib is captured in the groove, assisting the bushing in resiliently absorbing axial driving wheel loads exerted on the arm.

It is still another feature of the present invention to provide the rear bushing cavity half-round ceiling with an integral downwardly projecting eyebrow-like rail defining a stop face, in opposed relation to an aft face of the rear bushing, while the retainer has a transverse upwardly projecting ridge defining a stop surface adjacent its rear edge. The cavity stop face and retainer stop surface cooperate to provide upper and lower tolerance gaps with the bushing rear face, wherein the bushing is adapted to be trapped, within liberal adjustment limits, along the swing axis. The rear bushing cavity gaps allow precise location of the front bushing assembly at its front pivot bolt fitting, thereby assuring exact positioning of the arm balljoint relative to the vehicle frame member contributing to better control of caster and camber of the vehicle.

It is yet another feature of the present invention to provide an arrangement for readily mounting a one-piece suspension lower control arm casting on a vehicle frame member wherein the arm includes a lateral arm portion terminating in an integral front loop through which an axial machined bore extends, and wherein the front bushing assembly includes an elastomeric tube surrounding an inner metal sleeve adapted to receive therein a frame member front pivot bolt. An outer metal sleeve, which surrounds the elastomeric tube, is shorter than the tube while the inner sleeve is longer than the tube. The loop axial bore has a rearward opening into which a front end of the outer sleeve is press-fitted a specified axial distance therethrough providing ready close tolerance positioning of the front bushing assembly while allowing the arm portion bore ends to remain "as cast".

These and other objects and advantages of the present invention will be more fully understood from the following detailed description of the invention taken together with the accompanying drawings.

BRIEF DESCRIPTION OF THE DRAWINGS

In the drawings:

FIG. 1 is a fragmentary perspective view of a pair of vehicle body frame side rails supporting a sub-frame cradle of the present invention;

FIG. 1A is a fragmentary perspective view of the cradle left hand end arch with its suspension arm and isolator assemblies removed;

FIG. 2 is a perspective view of the underside of the mounting cradle of FIG. 1 prior to the attachment of a cradle bottom plate;

FIG. 5 is a detail top view of the mounting cradle of the present invention;

FIG. 6 is a vertical cross sectional view taken on the line 6—6 of FIG. 5;

FIG. 7 is a vertical cross sectional view taken on the line 7—7 of FIG. 5;

FIG. 16 is a top view of the left hand suspension lower control arm assembly;

FIG. 16A is a vertical sectional view taken on the line 16A—16A of FIG. 16;

FIG. 17 is a perspective view of the left hand suspension lower control arm of FIG. 16; and FIG. 18 is a fragmentary perspective view showing the rear bushing retainer being installed on the cradle rear housing.

DETAILED DESCRIPTION OF THE INVENTION

Figure 1B:
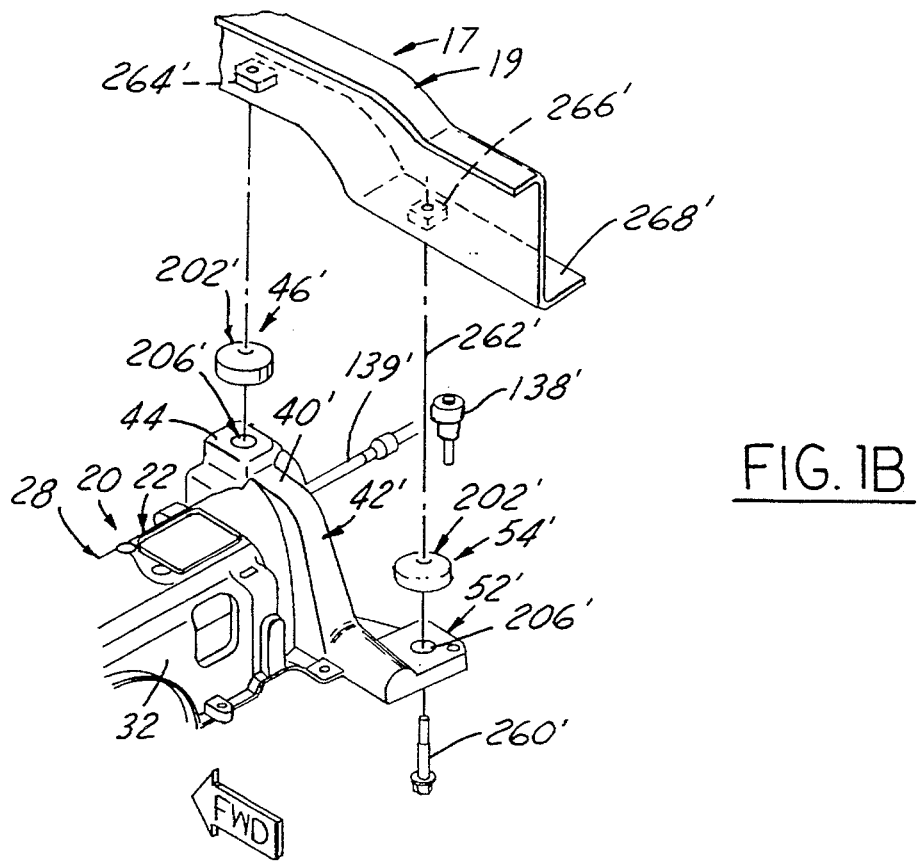
FIG. 1B is fragmentary, exploded, perspective view of the cradle right end arch, associated front and rear isolator upper mounts, and right hand frame side rail member.
Figure 4:
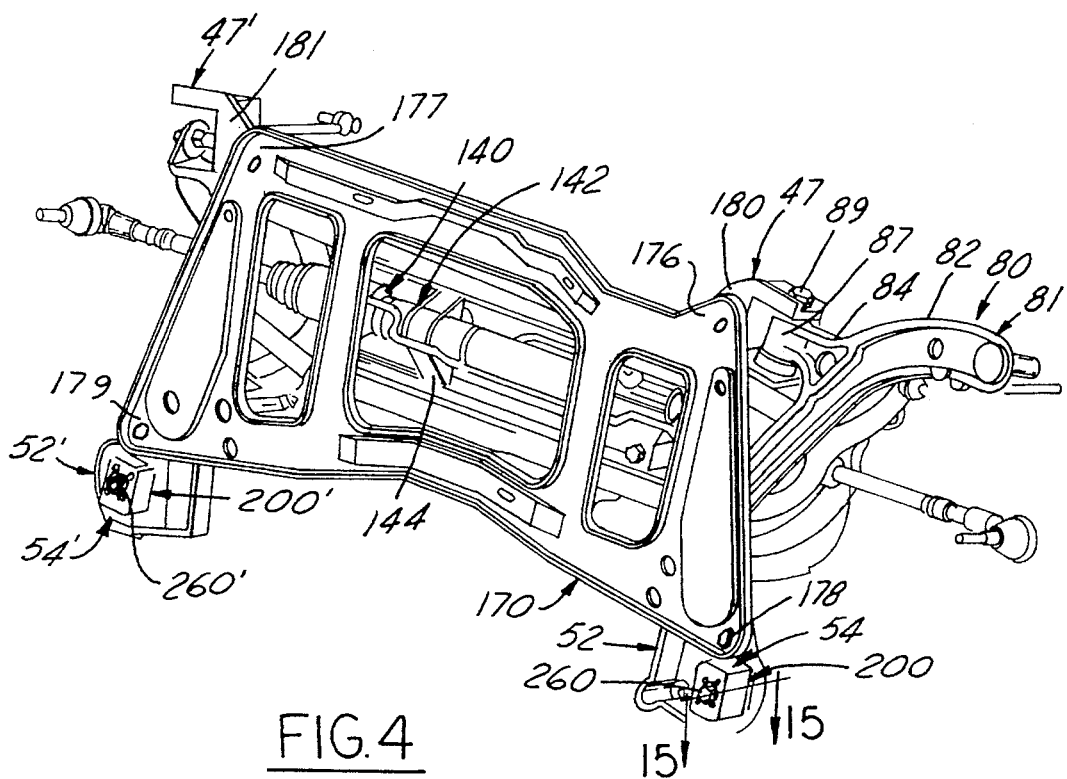
FIG. 4 is a perspective view, similar to FIG. 2, showing a cradle assembly adapted for installation in a vehicle.

Referring now to the drawings in detail, numeral 17 in FIG. 1 generally indicates a forward portion of a front-wheel-drive or an all-wheel-drive vehicle body frame. The frame 17 comprises left 18 and right 19 frame side rail members on which a sub-frame cradle assembly, generally indicated at 20, is mounted in accordance with the present invention. A preferred form of the cradle assembly 20 is shown in FIG. 1 as a unitary or one-piece aluminum casted subframe cradle 22, comprising laterally spaced apart left side 24 and right side 26 outboard arches (FIG. 14) integrally joined by a transversely extending inverted generally U-section saddle 28. FIGS. 5–7 show the saddle 28 defined by front 30 and rear 32 downwardly extending saddle walls joined by a saddle top bight wall 34.

Figure 14:
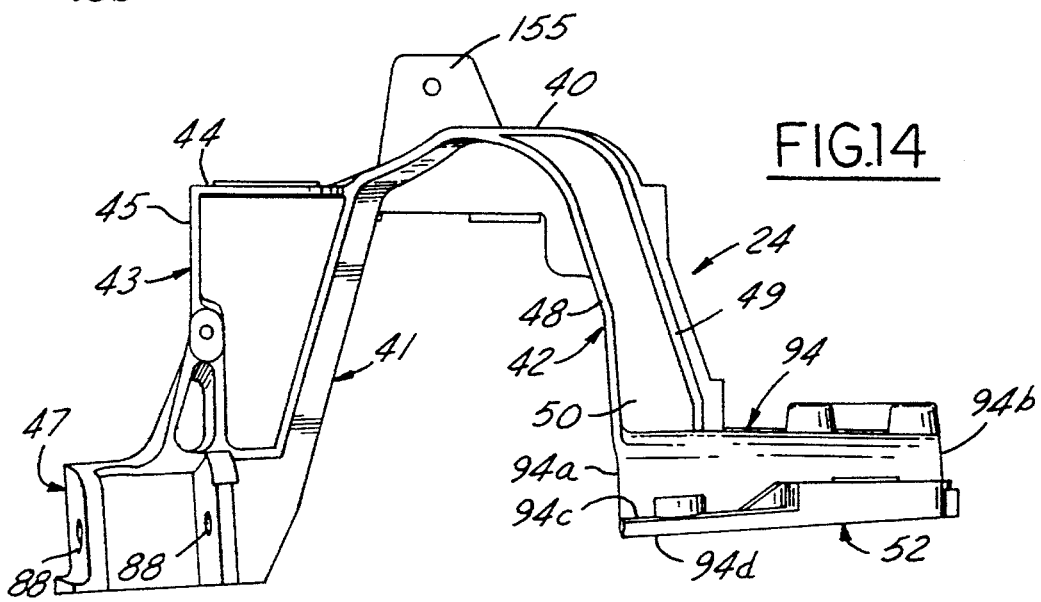
FIG. 14 is an enlarged left side view of the cradle of the present invention.

As seen in FIG. 14, the cradle left side arch 24 is defined by a top horizontal section 40 terminating at its fore and aft ends in downwardly diverging front 41 and rear 42 legs. The front leg 41 incorporates a body frame isolator mounting bracket 43, which includes a horizontal left front pedestal 44, supported by an upstanding bracket plate 45. In FIG. 1 the front bracket 43 is adapted to support a front isolator assembly for mounting to frame left rail member 18. The front leg 41 terminates at its lower distal end in a clevis fitting 47 for connection to a left hand lower suspension control arm front bushing.

FIG. 14 shows the left arch rear leg 42 cast in the form of an outwardly facing U-section channel consisting of front 48 and rear 49 side flanges, which extend laterally from a longitudinally disposed bight web 50. The flanges 48 and 49 converge upwardly to a juncture 51. The bight web 50 is joined to an associated end of the saddle rear wall 32. The left arch rear leg 42 terminates at its lower distal end in a footpad, generally indicated at 52, supporting a rear body isolator assembly 54 (FIG. 1) substantially identical to the front body isolator assembly 46. As seen in FIG. 5, the front pedestal 44 is machined with a front isolator assembly mounting aperture 55 while the rear footpad 52 has an identical rear isolator assembly mounting aperture 56.

Figure 3:
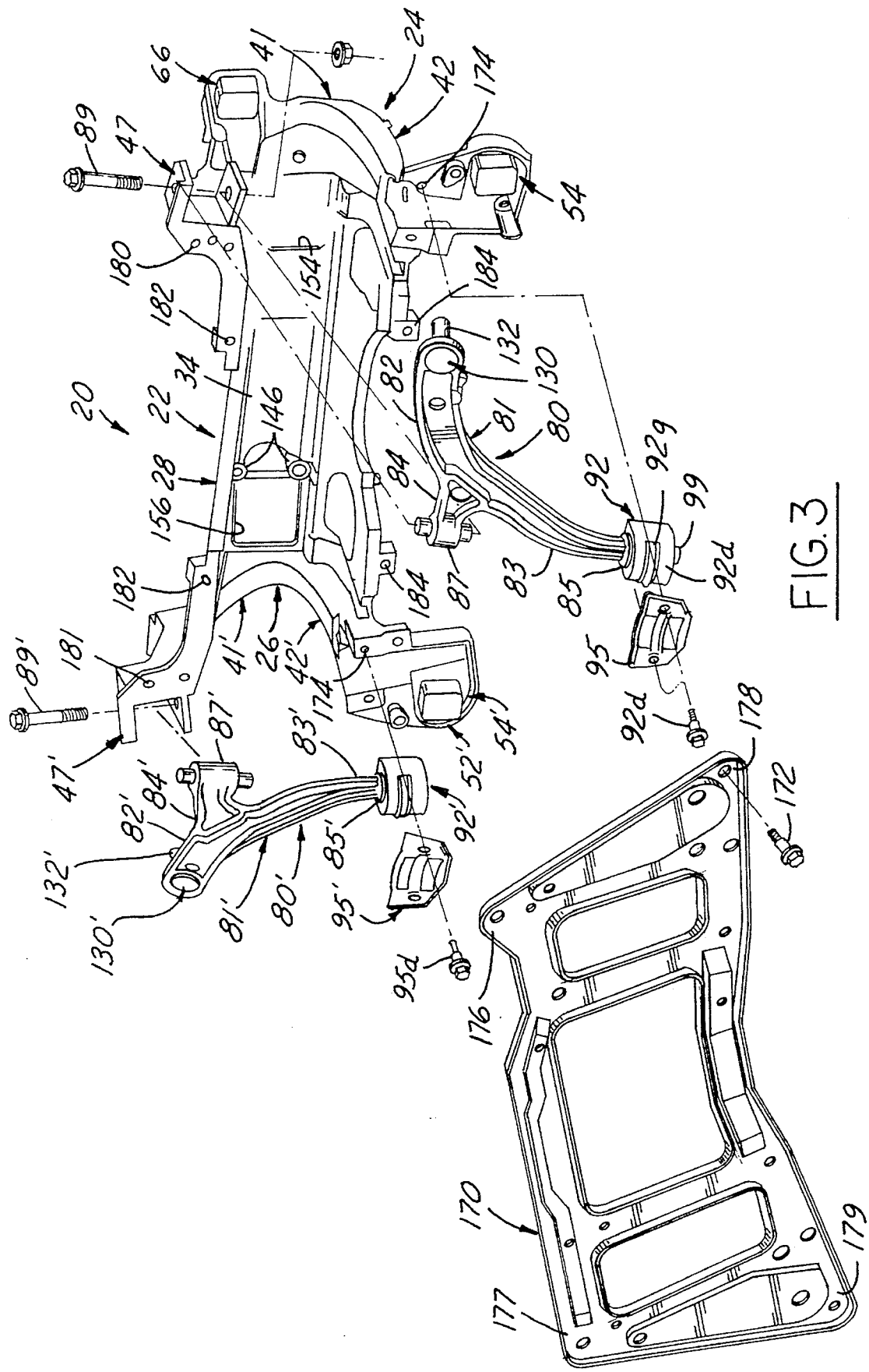
FIG. 3 is an exploded perspective view, similar to FIG. 2, showing the cradle with the rack and pinion steering assembly, lower control arms, and cradle plate removed.

With reference to FIGS. 1, 3, and 5, the cradle left 24 and right 26 pair of outboard side arches are generally symmetrical each other about a longitudinally extending vehicle center axis indicated by dashed line "L" in FIG. 5. As the arches 24 and 26 are generally mirror images of each other, the same reference numerals will be used to described both the left and right side arches, with the exception that the right side arch numerals will be primed.

FIGS. 1 and 5 show the right side arch 26 including a top section 40' ending in downwardly diverging front 41' and rear 42' legs. The right front leg 41' is formed with an isolator mounting bracket 43', having a front pedestal 44' and an upstanding bracket plate 45', FIG. 5. The pedestal 44' has an aperture 55' adapted to receive a right front isolator assembly 46', identical to left side isolator assembly 46. It will be seen in FIG. 5 that the leg 41' terminates at its lower end in a right hand front clevis fitting 47', while the rear leg 42' terminates in a footpad 52' formed with an aperture 56' for receiving a rear isolator assembly 54', FIG. 3.

In FIGS. 2 and 3, numeral 80 generally indicates a left hand suspension lower control arm assembly of the vehicle while 80' depicts a right hand lower control arm assembly. As the left and right control arm assemblies are mirror images of each other, only the left arm assembly 80 will be described in detail. Similar or corresponding elements of the right hand control arm assembly 80' are identified by the same reference numerals as used to describe the left hand control arm assembly 80, except that the numerals are primed.

Figures 8, 9, 9A, 9B:
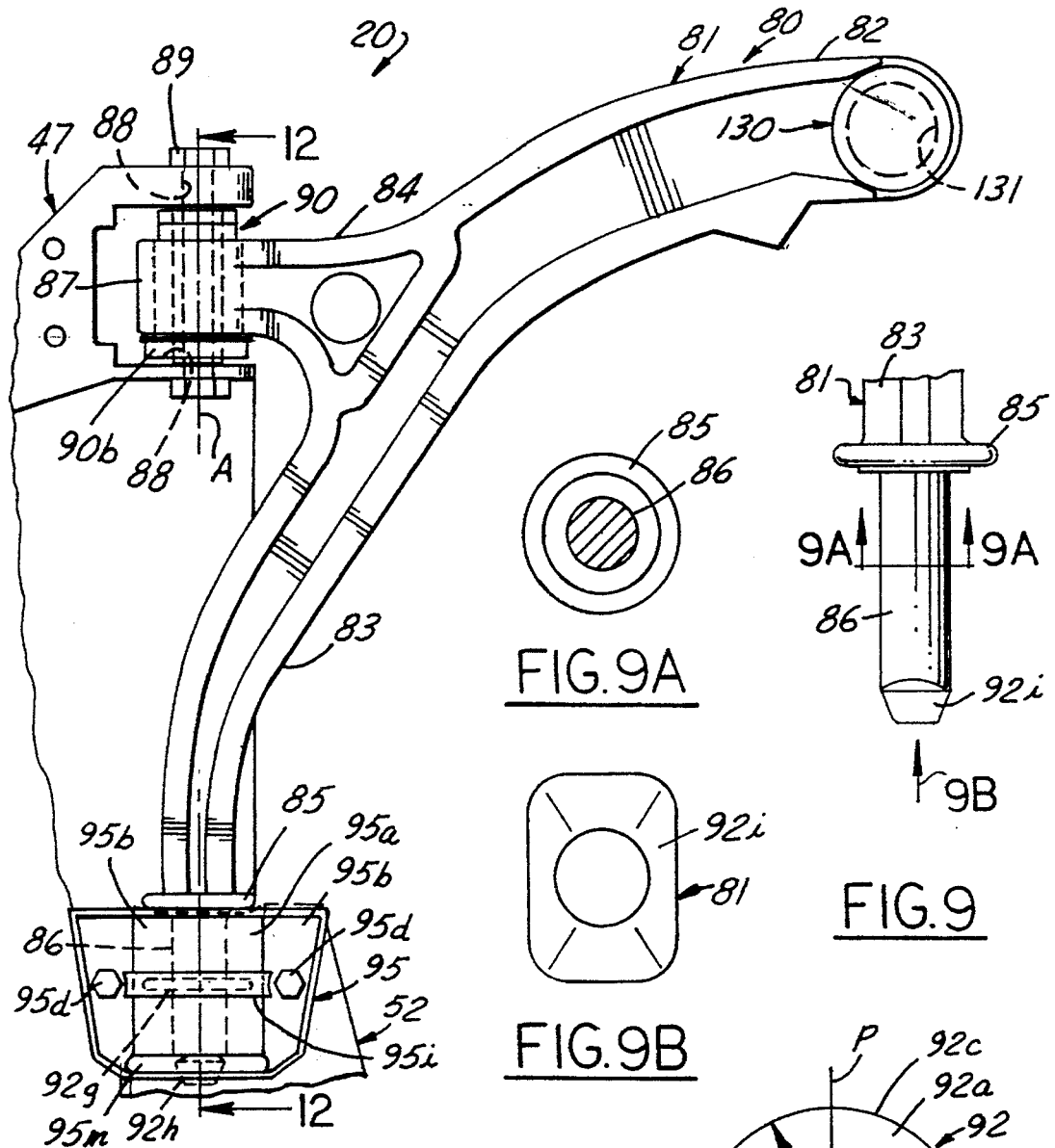
FIG. 8 is an enlarged fragmentary bottom view of the left hand suspension lower control arm of FIG. 1.
FIG. 9 is an enlarged fragmentary top view of the left hand suspension arm journal stem.
FIG. 9A is a vertical cross sectional view taken on the line 9A—9A of FIG. 9.
FIG. 9B is an enlarged end view taken in the direction of arrow "9B" in FIG. 9.
Figure 10:
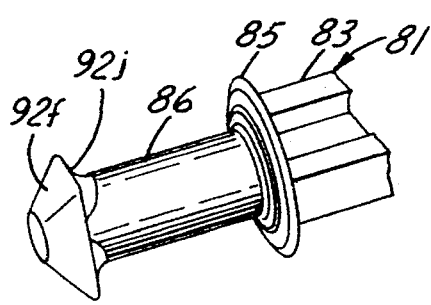
FIG. 10 is an enlarged fragmentary perspective view of the journal stem of FIG. 9.

The suspension lower control arm assembly 80, shown in FIGS. 1–3, includes a generally L-shaped one piece casted arm 81. The arm 81 includes a forward arm portion 82, adjacent to the front leg 41, and an aft arm portion 83 adjacent rear leg 44. FIG. 8 shows a control arm branch 84 extending transversely outboard from the front arm portion 82, while the rear arm portion 83 terminates in an annular collar 85, from which a rear bushing journal spindle or stem 86 extends rearwardly. It will be seen in FIGS. 2 and 8 that cradle left clevis fitting 47 is sized for reception of control arm integral loop 87 while clevis fitting aligned pair of axial bores 88 receive a pivot bolt 89. The clevis fitting bolt 89 is adapted for supporting a front pivot bushing assembly 90, FIG. 12, press-fitted in control arm loop 87 for rotation about left side control arm swing axis "A".

Figure 12:
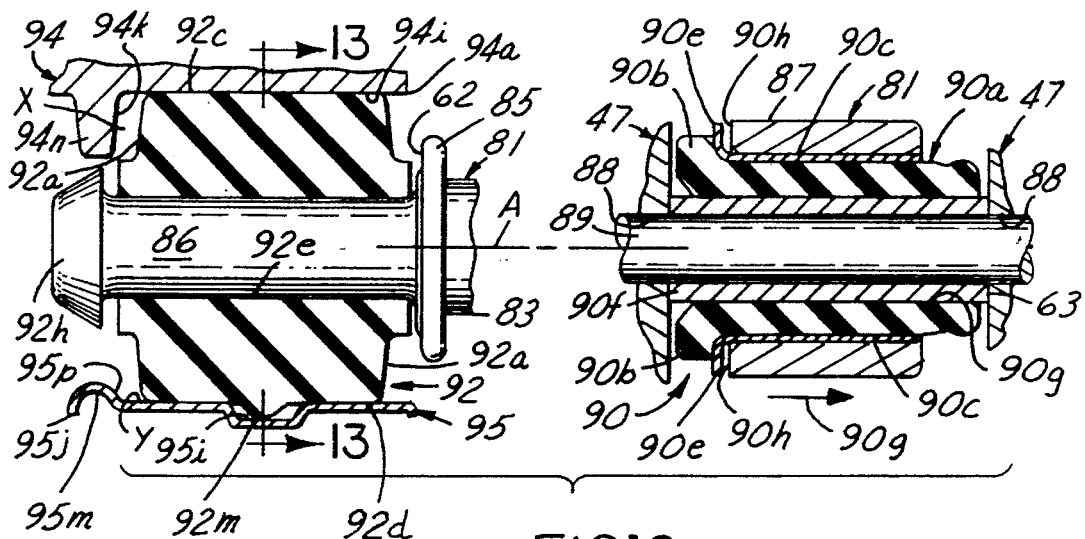
FIG. 12 is a fragmentary vertical cross sectional view, with parts broken away and partly in elevation, taken on the line 12—12 of FIG. 8.

Referring to FIG. 12, the front pivot bushing assembly 90 is a directional bushing and must be installed in the lower control arm loop 87 in a predetermined manner. FIG. 12 shows a generally cylindrical rubber bushing 90a, formed of rubber or other suitable elastomeric material, having a pair of opposed semi-circular raised portions 90b symmetrically disposed about a horizontal plane that includes the axis "A". The front bushing assembly 90 comprises an outer metallic cylindrical sleeve 90c, press-fitted in suspension arm loop bore 90d by means of a radial flange 90e, and a split metallic inner sleeve 90f mechanically fitted in front elastomer bushing inner bore 90i. The front bushing inner sleeve 90f is journally supported on the pivot bolt 89.

With reference to FIG. 16, the lower control arm 81 is shown in its preferred form as a one-piece casting adapted to be machined in one fixturing. The arm 81 is fixtured in V-blocks and clamped at the front bushing loop 87 and the rear bushing stem 86. A locator portion 60 is cast on arm wheel stop boss 61 establishing the radial position of the suspension arm, after which the arm is clamped in the fixture. The centers of the front bushing loop 87 and the rear bushing stem 86 are identified and the arm swing axis "A"

is established through the two centers. The radial locator 60 and the pivot axis "A" establish the radial datum for machining the arm front bushing loop inside diameter in relationship to the pivot axis "A". The pivot axis "A", established by the machined front bushing loop bore diameter and the cast rear stem 86, define the arm inboard/outboard datum.

As seen in FIG. 16, cast rear face 62 of the stem collar 85 establishes the fore/aft datum perpendicular to the axis "A". The fore/aft location of the front bushing 90 is determined by the distance "D", measured from collar aft face 62 to front face 63, FIG. 12, of the front bushing inner sleeve 90f. During control arm assembly on the fixture, the front bushing outer sleeve flange 90e is gripped, by means of special tooling, and the front bushing assembly is moved to the right, as seen by the arrow 90g in FIG. 12, into the bushing loop bore 90d. A pivoting head of the fixture allows the inner diameter of the loop bore to align itself with the front bushing assembly 90 as it is being installed. The inner sleeve 90f is moved into the loop bore until its front end face 63 contacts a microswitch upon reaching the specified dimension "D" It is critical to position the front bushing assembly in a close tolerance manner as it locates center 136 of suspension arm balljoint 130, shown in FIG. 16A, relative to the vehicle body frame 17.

In FIG. 16A, bottom surface 134 of balljoint hole 135 is machined in relationship to the axis "A", the collar face 62, and the radial datum. The wheelstop 61 is then machined in relationship to balljoint center 136 and the radial datum, thereby completing all the machining operations in one fixturing of the suspension arm 81 while maintaining the required tight tolerances.

Figure 11:
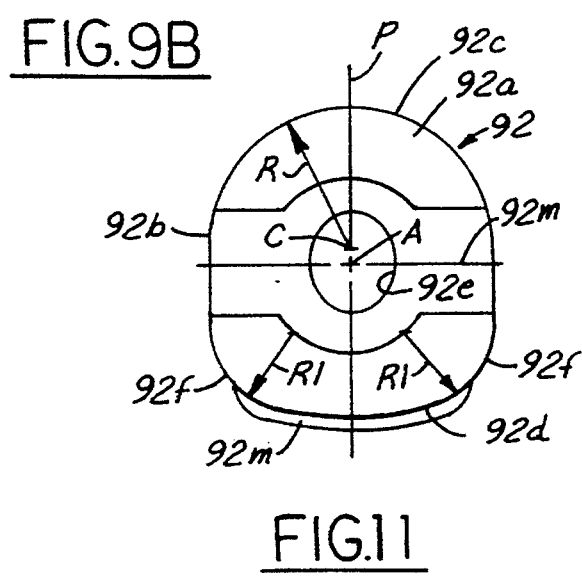
FIG. 11 is an enlarged detail view of one end face of the rear pivot bushing.
Figure 13:
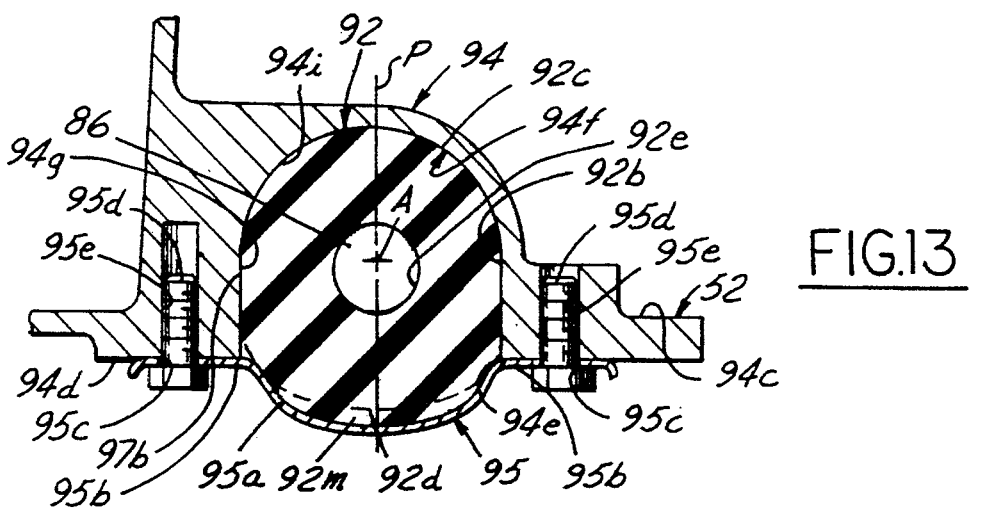
FIG. 13 is a fragmentary vertical cross sectional view taken on the line 13—13 of FIG. 12.

In FIGS. 11, 12, and 13, a rear pivot bushing 92, formed of rubber or other elastomeric material, is adapted for ready alignment on the axis "A" The rear bushing, which has identical end faces 92a, is shown in the detail view of FIG. 11 defining a generally oval shape with opposite parallel flat sides 92b. It will be seen in FIG. 11 that the rear bushing has an upper half round or 180 degree arc surface 92c, defined by a radius "R", having its center of curvature "C" spaced slightly above the swing axis "A". Lower surface 92d of the rear bushing 92, shown slightly curved in cross section, is joined to its respective flat sides by rounded junctures 92f, each defined by a relatively small radius "R1".

The rear bushing of FIG. 11 is provided with a central elliptical-shaped through passage 92e, aligned on the axis "A", adapted to be resiliently stretch-fitted on the control arm circular-section stem 86, FIG. 9A, which has a diameter of about 22.0 mm. The bushing passage 92e has a major vertical dimension of about 21.3 mm and a minor horizontal dimension of about 18.0 mm, while the stem has a diameter of about 22.0 mm. It will be noted that the stem circular section is sized for stretched snug reception in the bushing elliptical-shaped passage 92e. An installer is required to stretch the rear bushing on the stem 86 by pushing and rocking the bushing 92 until it is tightly fitted on the stem 86 in its design FIG. 12 position. It will be observed that with the bushing 92 in its design position, one end face 92a is axially spaced from opposed shoulder 92g of frusto-conical shaped nub 92h formed on the distal free end of the stem. The rear bushing front face 92a is shown axially spaced from opposed rear face 62 of stem collar 85. The rear bushing lower surface 92d is formed at its axial midpoint with a raised, transversely extending, rib 92m which, as viewed in FIG. 12, has a semi-circular cross section.

The rear bushing elliptical passage 92e is sized to obviate rotational or axial slippage of the rear bushing on the stem 86 ensuring that both its sides 92b "work" by resiliently absorbing lateral side loads received by the stem as a result of forward and aft longitudinally directed wheel loads imposed on suspension arm balljoint 130. It will be appreciated that a rearward acting wheel load on the balljoint 130 tends to pivot the arm assembly 80 about the front bushing 90 such that the stem 86 applies an inboard directed side force on the bushing 92. Conversely, a forward acting wheel load on the balljoint tends to pivot the arm assembly in an opposite direction, applying an outboard directed side force on the rear bushing.

With reference to FIGS. 13 and 14, a rear bushing housing 94 is integrally cast with the left side arch rear footpad 52 while a substantially mirror image housing 94' is similarly cast with the right side arch rear footpad 52'. The housing 94, which has an open front end 94a and a closed aft end 94b, FIG. 14, is shown upstanding from upper surface 94c of the cradle rear footpad 52. It will be seen in FIG. 13 that housing undersurface 94d is provided with an access opening 94e for a housing rear bushing cavity, generally indicated at 94f. The cavity 94f, which is defined by a pair of opposed internal parallel side surfaces 94g extending vertically from the access opening 94e, terminates in a half-round ceiling 94i. It will be noted that the inboard and outboard stem side loads imparted to the rear bushing sides 92b are resisted by associated cavity side surfaces 94g.

Referring to FIG. 8, a rear bushing retainer 95, having a generally trapezoidal shape in plan, includes a central concavo-convex body 95a which conforms to the lower surface of the rear bushing 92. FIG. 13 shows the retainer 95, which is symmetrical about a vertically disposed plane that includes axis "A", is formed with a pair of side attaching flanges 95b adapted for face-to-face flush mating contact with the housing underside 94d. Each side flange 95b has a mounting hole 95c for threaded reception of a machine bolt fastener 95d in an associated aligned housing bore 95e. Attachment of the retainer 95 to the housing undersurface 94d by the bolts traps the rear bushing in the cavity 94f. Upon the bolts 95d being tightened, the rear bushing is press-fit, in a pre-compressed manner, in the cavity 94f, whereby the bushing is adapted for resiliently absorbing suspension arm stem movement.

As mentioned above, the rear pivot bushing lower surface transverse raised rib 92m, having a rounded cross section, is adapted for capture in a transverse trough-section groove 95i formed in the retainer body 95a. The retainer body interior concave surface is shown in FIG. 18 formed with a transverse trough-section groove 95i which is adapted to capture the rib 92m therein upon attachment of the retainer to the housing undersurface. It will be noted in FIG. 12 that the groove 95i is slightly oversize in width relative to the axial dimension of the rib 92m providing an axial tolerance. This tolerance allows a predetermined leeway in axial positioning of the rear bushing on the stem so as to allow the bushing to be trapped between the housing cavity 94f and the retainer 95.

It will be seen in FIG. 12 that retainer aft edge 95j is defined by a radiused upwardly convex or half-round ridge 95m defining a stop surface 95p axially spaced from bushing rear end face 92a, defining a predetermined axial lower clearance gap "Y". Further, the cavity ceiling 94i has a downwardly projecting transversely extending semi-circular shaped blocking rail 94n providing a stop face 94k axially spaced from bushing end face 92a defining a predetermined axial upper clearance gap "X" The rail stop face 94k is adapted, together with the ridge stop surface 95, to contact the bushing opposed rear end face 92a to provide the axial tolerance leeway upper "X" and lower "Y" gaps for suspension arm assembly and installation on the vehicle frame 17. The clearance gaps permit axial positioning of the rear bushing 95 and stem 86 within tolerance limits on the axis "A", thereby allowing close tolerance positioning of the front bushing assembly 90. Exact placement of the front bushing assembly is critical because the assembly must precisely locate the suspension arm balljoint 130, FIG. 8, to its associated body frame side rail 18. The resulting tight tolerances contribute to better control of caster and camber of the vehicle.

It will be noted in FIGS. 13 and 18 that with the rear bushing upper portion being received in the housing cavity 94f, and the bolts 95b threaded in their associated bores 95e the rear bushing is trapped between the cavity and the retainer 95. The rear bushing is molded to a predetermined matching configuration relative to the cavity and retainer central body which is slightly oversize. Thus, upon being tightened, the bolts 95b urge the retainer side flanges into flush contact with the housing undersurface, whereby the retainer applies a pre-compression load on the elastomeric rear bushing. As a result, the mounting arrangement allows the rear bushing to resiliently absorb lateral inboard and outboard imposed stem loads resulting from forward and aft directed wheel forces transferred to the lower control arm 80.

With reference to FIGS. 12 and 17, the rear bushing 92 is shown with each of its front and rear faces 92a formed with a pair of opposite wedge-shaped mirror image block portions 92k. As seen in FIG. 11, the block portions 92k are symmetrically disposed about rear bushing horizontal axis. FIG. 17 shows each wedge-shaped block portion 92k has its base 92n formed coplanar with its associated side face 92b. The block portions 92k provide additional elastomeric material to assist the rear bushing in resiliently absorbing lateral inboard and outboard imposed stem side loads.

FIG. 8 shows the left hand control arm 81 front arm portion 82 terminating in balljoint 130 pressed into a seated position in an arm bore 131. The balljoint 130 has an upstanding stud 132, FIG. 3, adapted for pivotal connection to its associated steering knuckle arm, shown at 134 in FIG. 1. As seen in FIG. 1, the arm 134 has its upper end connected to a suspension strut 136 while aft knuckle member 137 connects tie rod 138 to steering rod 139 of power assisted rack and pinion steering gear assembly 140.

Referring to FIG. 2, the rack and pinion steering assembly 140 is shown mounted to an underside of the cradle bight wall 34 by a semi-circular right hand bracket 142, secured by a pair of bolts 144 to associated cradle integral threaded bosses, shown at 146 in FIG. 3. In FIG. 2, a second left hand bracket 148 mounts the steering assembly 140 to the cradle bight wall underside by bolt 150.

A steering assembly control valve, shown at 152 in FIG. 1, extends upwardly through a left hand rectangular aperture 154 provided in the cradle bight wall 34, intermediate the cradle left hand arch upper section 40 and a pair of laterally spaced apart upstanding engine mounting bracket flanges 155. It will be noted that a right hand rectangular aperture 156 is also provided in the bight wall 34 for accommodating a control valve of an optional right hand steering assembly. The left hand steering assembly 140 is packaged in a space efficient, compact nested manner on the underside of the cradle bight wall thus avoiding interference with other cradle supported components.

With reference to FIG. 2, it will be seen that a front stabilizer bar assembly 160 is also adapted to be mounted on the underside of the cradle bight wall 34 by means of a pair of annular bar brackets 162. The brackets 162, shown encircling associated elastomeric isolator bushings 164, are secured to the cradle by bolts 166. By virtue of the steering assembly 140 and stabilizer bar assembly 160 being retained on the underside of the cradle bight wall, the cradle foreword 30 and aft 32 side walls, together with a cradle reinforcement plate 170 to be described below, shield the assemblies 140 and 160 from engine catalytic converter heat and direct stone impingement.

As seen in FIG. 3, a generally trapezoid-shaped cradle plate is shown at 170 adapted for mounting on the underside of the cradle by a plurality of bolts 172 received in corresponding cradle bores 174. The cradle plate 170 has a pair of front corner portions 176 and 177 and a pair of rear corner portions 178 and 179 provided with associated bolt holes. Further, the pair of front clevis fittings 47 and 47' each include respective integral pad portions 180 and 181 adapted for flush bolted attachment of a corresponding pair of cradle plate front corner portions 176 and 177. In a like manner, the pair of rear footpads 52 and 52' are each adapted for flush bolted attachment to their corresponding pair of cradle plate rear corner portions 178 and 179. It will be appreciated that upon attachment of the cradle plate 170, each of the cradle left side 24 and right side 26 arches each have associated front leg clevis fitting integral pads 180 and 181 and associated rear leg footpads 52 and 52' fixedly attached to the cradle plate 170 to provide a unitary subframe cradle structure. In addition, as seen in FIG. 3, the cradle transverse saddle front 30 and rear 32 walls have their lower distal ends formed with respective pairs of integral front 182 and rear 184 flange portions for bolted attachment to the cradle plate 170 to further unify the cradle and plate structure.

Referring to FIG. 1, the cradle assembly 20 is mounted at four points on the vehicle body frame 17, by two front isolator assemblies 46 and 46' and two rear isolator assemblies 54 and 54' with all four assemblies being substantially identical. In the description of the left rear isolator assembly 54 that follows, it will thus be understood that such description applies to the remaining three cradle isolator assemblies 46, 46', and 54'.

Figure 15:
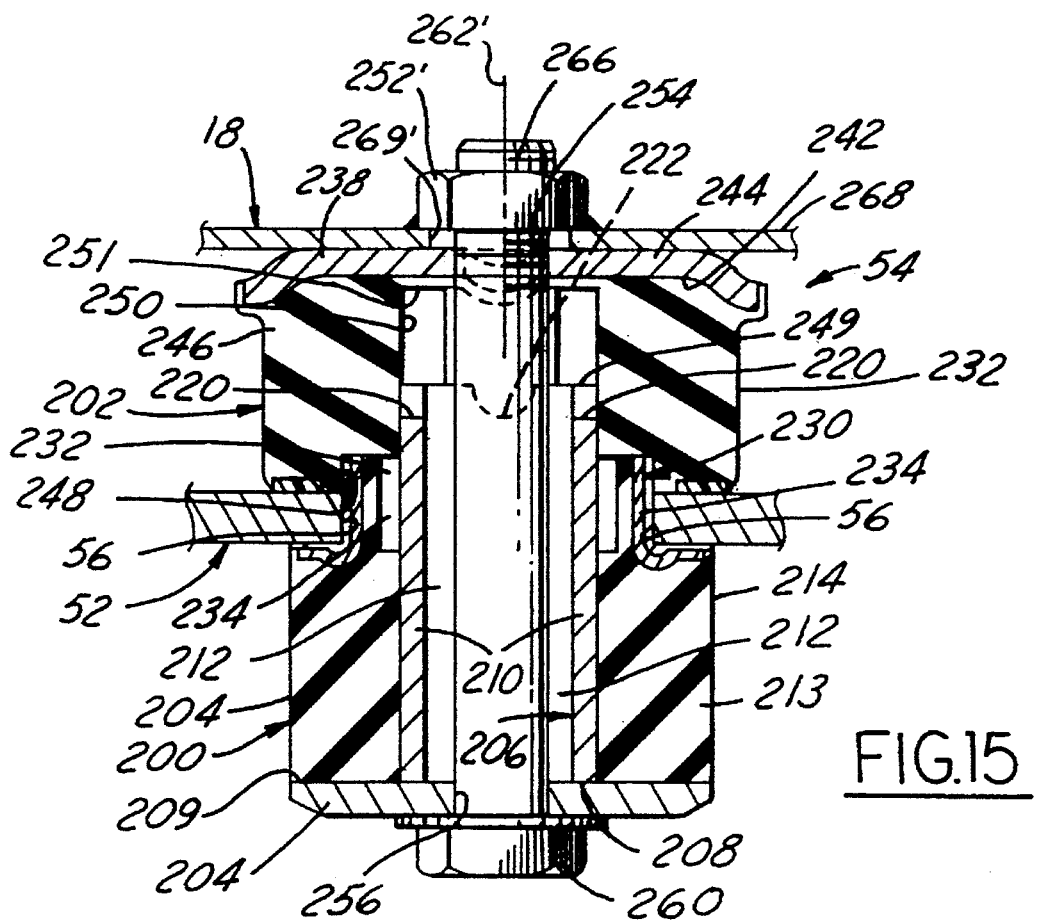
FIG. 15 is an enlarged fragmentary vertical cross sectional view of a vehicle body left rear isolator assembly, shown in its free state, taken on the line 15—15 of FIG. 4.
Figure 15A:
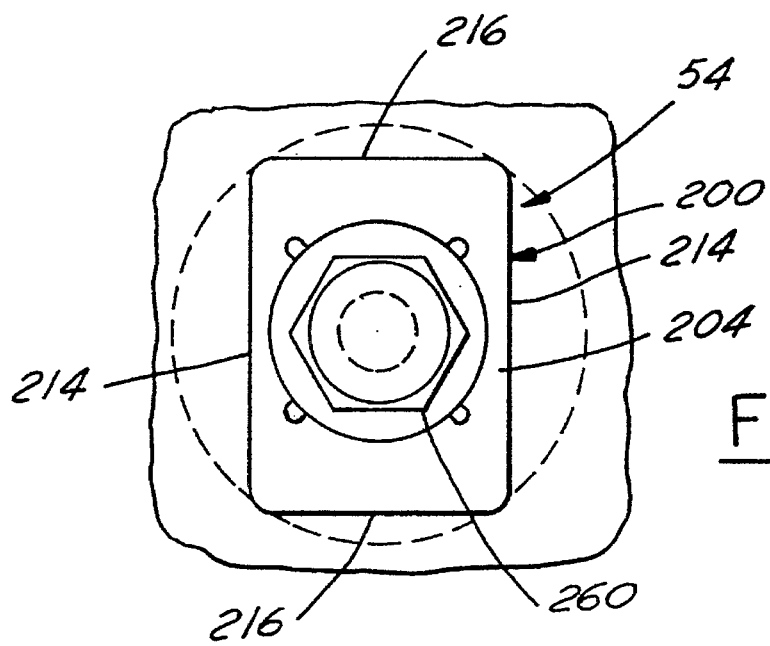
FIG. 15A is a fragmentary bottom view of the isolator mount of FIG. 15.

The left rear isolator assembly 54, shown in FIG. 15, includes a lower block-shaped cushion mount 200 and an upper disc-shaped cushion mount 202. The lower cushion mount 200 includes a lower metal base 204 supporting an upstanding square-sectioned central inner pillar 206 having its lower end 208 fixed, as by welding, to inner surface 209 of the base 204. Pillar 206 includes a pair of identical front and rear wall portions 210–210 and a pair of identical side wall portions 212–212 each bonded to a surrounding generally rectangular-shaped block member 213 of elastomer material such as rubber, defined by opposite parallel sides 214 and ends 216, FIG. 15A. The pillar side wall portions 210–210 each terminate at an upper end with aligned half-circle cutouts 220 while the two identical end portions 212–212 each terminate at an upper end with aligned half-circle cutouts 222.

The lower cushion mount block 213 terminates at its upper end in an upstanding square-section metal collar 230 having its outer and inner faces bonded to conforming layers of elastomeric material. The collar 230 has a predetermined size for snug press-fit reception in its associated rectangular-shaped rear lower mount opening 56 in footpad 52, FIG. 1A. It will be seen in FIG. 16 that a pair of opposite voids 232 are provided between a pair of opposed pillar side wall portions 210–210 and their associated collar upstanding side flanges 234.

The upper cushion mount 202 has an annular cap 238 with its underside 242 bonded to upper surface 244 of upper mount elastomer disc member 246. Each of the four lower cushion mounts 200 has its collar 230 press-fitted into an associated cradle opening 55, 55', 56, and 56' prior to the shipment of the cradle 22 to the vehicle final assembly.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. An arrangement for mounting a suspension lower control arm about a swing axis to a vehicle support frame, said arrangement comprising:

a control arm formed with a lateral arm portion provided with an axial bore receiving a front bushing assembly therein and an aft projecting arm portion ending in an integral rear stem extending through a rear elastomeric bushing axial passage, said rear bushing having a generally oval-like cross section defined by upper and lower curved surfaces joined by planar sides;

said frame having a front fitting bolt for pivotal connection with said front bushing assembly, and a rear housing formed with a cavity, said housing defining an undersurface having a cavity access opening from which opposed side faces of said cavity extend upwardly terminating in a curved ceiling, said cavity configured and sized for receiving an upper portion of said rear bushing therein while a remaining lower portion of said rear bushing extends below said undersurface;

a rear bushing retainer comprising a concave central body conforming to said rear bushing lower surface, said retainer having a pair of side flanges, each said flange adapted for securement by a fastener to an opposed portion of said undersurface so as to trap said rear bushing between said cavity and said retainer body whereby said front fitting bolt and said rear stem are aligned on the swing axis.

2. The control arm mounting arrangement as set forth in claim 1 wherein each said retainer fastener has a shank adapted for threaded engagement with an associated bore in said undersurface, whereby upon said fasteners being tightened said retainer flanges are drawn into flush contact with an opposed portion of said undersurface causing said rear bushing to be retained in a resiliently pre-compressed manner in said cavity.

3. The control arm mounting arrangement as set forth in claim 1 wherein said stem integrally formed at its proximal end with a collar and integrally formed at its distal end with a nub, said rear bushing axial passage being adapted to be stretched-over said stem nub for positioning on said stem between said collar and said nub thereby retaining said rear bushing on said stem.

4. The control arm mounting arrangement as set forth in claim 3 wherein said nub in the form of a frusto-pyramid is defined by a rectangular-shaped base disposed normal to the swing axis.

5. The control arm mounting arrangement as set forth in claim 1 wherein said rear bushing lower surface is formed, adjacent its axial midpoint, with a transversely extending raised rib adapted for reception in a transversely extending trough-shaped groove formed in said retainer body.

6. The control arm mounting arrangement as set forth in claim 5 wherein said trough-shaped groove having an axial width a predetermined dimension greater than the axial width of said rear bushing raised rib such that said bushing is axially positionable within limits on said stem.

7. The control arm mounting arrangement as set forth in claim 1 wherein said rear bushing axial passage has an elliptical cross-section such that its major axis is vertically disposed and intersects its horizontally disposed minor axis whereby the intersection of said major and minor axes is aligned on said swing axis, and wherein said stem has a circular cross section the predetermined diameter of which has a dimension slightly less than the minor dimension of said passage.

8. The control arm mounting arrangement as set forth in claim 1 wherein said rear bushing upper surface has a cross section in the form of a half-round circle and said cavity ceiling cross section is in the form of a conforming half-round circle matching said rear bushing upper surface.

9. The control arm mounting arrangement as set forth in claim 8 wherein said rear bushing upper half-round surface has a center of curvature defined by a radius has its center located on said bushing passage major axis slightly above the swing axis.

10. The control arm mounting arrangement as set forth in claim 1 wherein said rear bushing has opposite front and rear faces each integrally formed with a pair of generally horizontally opposed block portions providing additional rear bearing elastomeric material adapted for resiliently absorbing lateral inboard and outboard imposed stem loads resulting from forward and aft wheel forces transferred to the suspension arm.

11. The control arm mounting arrangement as set forth in claim 10 wherein each said pair of block portions are substantial mirror images, wherein each said block portion defines a generally wedge shape in horizontal cross section, and wherein each said block portion has a wedge base located co-planar with an associated planar side of said rear bushing.

12. The control arm mounting arrangement as set forth in claim 3 wherein said lateral arm portion terminates in an integral front loop through which said axial bore extends, said front bushing assembly comprising an elastomeric tube surrounding an inner metal sleeve adapted to receive said front pivot bolt, and an outer metal sleeve concentrically surrounding said elastomeric tube, said outer sleeve has a length shorter than said tube and said inner sleeve having a length longer than said tube, said loop axial bore having a rearward opening into which a front end of said outer sleeve is press-fit therein, in a forward direction, a specified axial distance relative to a cast aft face of said stem collar, and whereby said inner sleeve front end is positioned a predetermined dimension from a rear face of said stem collar providing ready close tolerance positioning of said front bushing assembly.

13. The control arm mounting arrangement as set forth in claim 12 wherein said outer sleeve is formed with a radial flange on its aft end, said radial flange enabling said front bushing said front bushing assembly to be pushed or pulled into said loop bore.

\* \* \* \* \*